(12) United States Patent
Petrella et al.

(10) Patent No.: US 9,720,118 B2
(45) Date of Patent: Aug. 1, 2017

(54) MICROSEISMIC MONITORING WITH FIBER-OPTIC NOISE MAPPING

(71) Applicant: KOBOLD SERVICES INC., Calgary (CA)

(72) Inventors: Allan Petrella, Calgary (CA); Mark Andreychuk, Calgary (CA); Per Angman, Calgary (CA)

(73) Assignee: KOBOLD CORPORATION, Calgary (CA)

( * ) Notice: Subject to any disclaimer, the term of this patent is extended or adjusted under 35 U.S.C. 154(b) by 377 days.

(21) Appl. No.: 14/405,609

(22) PCT Filed: Jun. 11, 2013

(86) PCT No.: PCT/CA2013/050441
§ 371 (c)(1),
(2) Date: Dec. 4, 2014

(87) PCT Pub. No.: WO2013/185225
PCT Pub. Date: Dec. 19, 2013

(65) Prior Publication Data
US 2015/0135819 A1    May 21, 2015

Related U.S. Application Data

(60) Provisional application No. 61/658,277, filed on Jun. 11, 2012, provisional application No. 61/774,486, filed on Mar. 7, 2013.

(51) Int. Cl.
| | | |
|---|---|---|
| E21B 47/107 | (2012.01) | |
| G01V 1/20 | (2006.01) | |
| G01V 1/28 | (2006.01) | |
| G01V 1/40 | (2006.01) | |
| E21B 47/10 | (2012.01) | |
| E21B 47/12 | (2012.01) | |
| G01H 9/00 | (2006.01) | |
| G01V 1/52 | (2006.01) | |
| G01V 8/00 | (2006.01) | |

(Continued)

(52) U.S. Cl.
CPC ............ *G01V 1/288* (2013.01); *E21B 47/101* (2013.01); *E21B 47/123* (2013.01); *G01H 9/004* (2013.01);
(Continued)

(58) Field of Classification Search
None
See application file for complete search history.

(56) References Cited

U.S. PATENT DOCUMENTS

| | | | | |
|---|---|---|---|---|
| 4,162,400 A | * | 7/1979 | Pitts, Jr. ................ | E21B 47/123 250/256 |
| 5,771,170 A | * | 6/1998 | Withers ................ | G01V 1/008 702/14 |

(Continued)

*Primary Examiner* — Jill Culler
(74) *Attorney, Agent, or Firm* — Parlee McLaws LLP; Sean W. Goodwin; Linda M. Thompson (57) ABSTRACT

The combination of one or more 3-component microseismic sensors deployed into a wellbore adjacent a microseismic event and a linear array of distributed fiber optic acoustic sensors deployed uphole thereof provides two sets of data for establishing noise-free signals for locating the microseismic event in the formation about the wellbore. The distributed fiber optic signals monitor noise transmitted along coiled tubing used to pump a completion operation or as a result of the fluid flowing through the casing or coiled tubing, or along wireline used to deploy the microseismic sensors. The noise is mapped and extrapolated for estimating noise at the 3-component sensors. The estimated noise is removed from the 3-component sensor data for producing clean signals representing the location of the microseismic events.

18 Claims, 9 Drawing Sheets

(51) Int. Cl.
*G01V 99/00* (2009.01)
*G01V 1/18* (2006.01)

(52) U.S. Cl.
CPC .................. *G01V 1/40* (2013.01); *G01V 1/52* (2013.01); *G01V 8/00* (2013.01); *G01V 99/005* (2013.01); *G01V 1/18* (2013.01); *G01V 1/20* (2013.01); *G01V 2210/00* (2013.01); *G01V 2210/30* (2013.01)

(56) References Cited

U.S. PATENT DOCUMENTS

| | | | | |
|---|---|---|---|---|
| 6,137,621 A * | 10/2000 | Wu | ......................... | G01H 9/004 |
| | | | | 181/102 |
| 6,246,962 B1 * | 6/2001 | Schultz | .................. | G01V 1/364 |
| | | | | 702/17 |
| 6,288,975 B1 * | 9/2001 | Frederick | ............... | G01H 9/004 |
| | | | | 181/102 |
| 6,751,556 B2 * | 6/2004 | Schroeder | .............. | G01K 11/32 |
| | | | | 374/E11.015 |
| 6,837,332 B1 * | 1/2005 | Rodney | .................... | G01V 1/48 |
| | | | | 181/0.5 |
| 8,422,334 B2 * | 4/2013 | Maisons | ................ | G01V 1/008 |
| | | | | 367/14 |
| 2013/0265851 A1 * | 10/2013 | Faber | ........................ | G01V 1/42 |
| | | | | 367/25 |

* cited by examiner

MICROSEISMIC MONITORING WITH FIBER-OPTIC NOISE MAPPING

CROSS REFERENCE TO RELATED APPLICATIONS

This application claims the benefit of U.S. Provisional Application 61/658,277, filed Jun. 11, 2012 and U.S. Provisional Application 61/774,486, filed Mar. 7, 2013, the entirety of which are incorporated fully herein by reference.

FIELD

Embodiments disclosed herein relate to monitoring of microseismic events outside a wellbore, such as those caused by fracturing of a formation, and more particularly, relate to use of fiber-optics for reducing noise in the microseismic signals for locating the microseismic event in the formation.

BACKGROUND

Simplistically, microseismic monitoring, in the context of the oil and gas industry, typically requires placement of receiver systems at surface or otherwise adjacent a microseism or downhole event, such as in an adjacent wellbore, for detecting and locating the events in time and space. The microseisms occur either as a result of a process occurring within a wellbore such as drilling, or pumping fluids, or as a result of events adjacent the wellbore, such as the creation and propagation of hydraulically-induced fractures in the surrounding formation. Further, the microseisms can be purposefully initiated in the wellbore or near wellbore such as by firing a string shot or a perforating shot therein to obtain data. Such data can instruct as to velocity within the various strata of the formation surrounding the wellbore, to better understand the nature and extent of the zones of interest therein.

The receiver systems, typically geophones or accelerometers which can be single component or three-component, receive compressional (P-wave) and shear (S-wave) data generated from the microseism and the data are used to locate and map the events at least in space, typically using Cartesian co-ordinates, X, Y and Z.

Typically, a 3-D seismic velocity model is created using the microseismic data from a zone of interest. Measured or estimated microseismic data typically comprises a time of occurrence of a microseismic event within the zone, a location of occurrence of the microseismic event within the zone, and an arrival time of the time and location data at a detection point, typically at a surface array. Prior art microseismic monitoring typically relies on geological information via downhole logs to determine the velocity of microseismic events downhole with varying degrees of accuracy. In many cases, estimated values for at least some of the parameters required to create the velocity profile must be made, as accurate measurements and synchronized time-stamping of the microseismic event in the zone of interest have been difficult to measure directly using conventional technologies.

The velocity model is typically used to calculate the position of microseismic events and monitor the growth or propagation of a fracture or to understand the geometry of the developing fracture within the zone. It is assumed that the microseismic events are generated by the fracture in the formation. This information can be used to optimize the fracture by controlling its growth and extent and thereby improve oil and gas production. In order to ensure the velocity model is accurate, the microseismic data collected must be accurate. Accuracy of the microseismic data collected depends on the accuracy of the time data, location data for the surface probes and arrival times of the event at the surface probes. As microseismic amplitudes are small, detection of the event at surface may be difficult.

In many prior art systems the velocity model is created using as least some estimated or calculated parameters. Thereafter, the velocity model is used together with measured time data to calculate the position of the microseism in 3D space. Inaccuracies in the velocity model result in incorrect mapping of the event. The inaccuracies, when relying upon the map for placement of fractures within very restricted zones of interest, may result in fractures which are not positioned properly relative to the wellbore (azimuthal errors) and do not extend to the furthest extents of the zone resulting in reduced or less than optimal production. Further, the inaccuracies may result in fractures that exceed the zone of interest and result in break through, formation damage in sensitive zones and other adverse effects.

Typically, systems which monitor microseismic events and propagation of the fracture using sensors located in an offset, vertical wellbore, are more accurate in positioning the event vertically in space (Z) and are less accurate when determining horizontal co-ordinates (X,Y). Conversely, systems which measure the event at surface, such as using an array of surface sensors, are typically more accurate in positioning the event along the horizontal axes (X,Y), but are less accurate in measuring the vertical location (Z). Detection may be adversely affected by the formation characteristics resulting in poor signals particularly in the case of microseismic events which are typically relatively small.

Others have attempted to improve microseismic monitoring by utilizing optical fibers to replace conventional sensors for measuring microseisms and, in particular, for real-time monitoring of hydraulic fracturing.

As described in SPE Paper 152981; "Real-Time Downhole Monitoring of Hydraulic Fracturing Treatments Using Fiber Optic Distributed Temperature and Acoustic Sensing"; Molenaar et al, March 2012, in 2009 it was demonstrated that fiber optic distributed sensing could be used for downhole applications. It has been shown that optical fiber deployed into a wellbore, permanently or temporarily, can be used to measure temperature, strain, pressure and acoustics. It has been proposed that the combination of fiber optic distributed sensing of temperature (DTS) in combination with fiber optic distributed acoustic sensing (DAS) may permit real-time monitoring to understand the complexity of the fracturing treatments.

As one of skill will appreciate, distributed sensing utilizes the light scatter which occurs in an optical fiber. When using fiber optics having sensors based on Raleigh scattering, the light scattered back from the fiber has three different spectral parts which are detected and analyzed for measuring the various parameters:
  the Raleigh scattering with the wavelength of the laser source used;
  the Stokes line components from photons shifted to longer wavelength (lower frequency);
  the anti-Stokes line components with photons shifted to shorter wavelength (higher frequency) than the Raleigh scattering.

As one of skill in the art will appreciate different types of fibre optics may have different types of sensors, such as Bragg gratings, the light scattered therefrom being analyzed for parameters appropriate thereto.

In the case of distributed acoustic sensing, a standard single-mode optical fiber acts as an array of microphones which provide acoustic data detected within the vicinity of the fiber. For example, a 5 km long fiber can be interrogated using DAS so that every 5 m can be recorded providing 1,000 independent, simultaneously sampled acoustic sensors, each with a 20 kHz bandwith. Parameters can be adjusted to optimize performance.

A short pulse of coherent light is sent down the fiber and the backscattered light is detected on a photo detector (at surface). The backscattered light is processed to extract the acoustic signals from each position along the fiber. Pressure pulses, such as observed with seating of balls in "plug and pert" operations, are also detected by DAS.

In testing, described in SPE Paper 152981, the fiber-optic cable was attached along an outside of production casing. Where the wellbore was cased and cemented, the fiber-optic cable was attached to the outside of the casing and was thereafter embedded in the cement.

As taught in US 2011/0292763 to Coates et al (Schlumberger Technology Corporation) optical fiber cable has been attached to the inside or the outside of tubing, including coiled tubing, casing and the like, in a variety of ways such as magnetically, using adhesive or cementing the fiber in place. The fiber optic sensors are either bare or encased along their length in a protective coating or jacket. Further, the sensors may be encased in a compliant material that is particularly sensitive to pressure, such as metalized foam or an acoustic-matching medium, typically a gel, for enhancing sensitivity of the seismic measurement. The fiber optic cable can also be installed inside a control line or other thin-walled tubing.

One or more of the fiber optic distributed sensors are deployed into one or more boreholes. The fiber is disturbed by the passing seismic waves and is strained by the waves if the waves couple to the fiber. A strain on the fiber changes the relative position between the scattering centers by simple elongation of the fiber. The strain also changes the refractive index of the glass of the fiber. Both of these effects alter the relative phase of the light scattered from each scattering center as is understood by those of skill in the art. The electrical signals emerging from a detector at surface are processed to detect the passage of a seismic wave and possible to determine the relative time of the wave's passage at different locations along the borehole and possibly the wave's spectral content.

Clearly, there is interest in the industry for apparatus and methods which effectively and efficiently detect and monitor microseismic events. Further, there is interest to improve the quality of the data obtained for deriving information regarding the microseismic events occurring beyond the wellbore and for reducing noise associated with events other than those of interest.

SUMMARY

Generally, embodiments disclosed herein utilize a combination of at least one microseismic sensor, such as 3-component geophone, and a linear array of distributed fiber optic sensors, deployed within a wellbore to be completed. The wellbore is typically used for accessing a formation for fracturing operations. The linear array extends along a length of the wellbore uphole of the at least one microseismic sensor. The linear array detects noise within the wellbore, such as noise transmitted along coiled tubing used to deploy the linear array and the microseismic sensor or casing in the wellbore. The noise detected at each of the fiber optic sensors in the array is mapped. The mapped noise is extrapolated to the location of the microseismic sensor and the extrapolated noise is subtracted from the data collected by the microseismic sensor during fracturing for producing signals representative of the location of microseismic events. In embodiments, three-axially-spaced microseismic sensors are used.

In one broad aspect, a system deployed within a wellbore for detecting microseismic events in a formation adjacent the wellbore, comprises at least one 3-component microseismic sensor deployed in the wellbore adjacent the microseismic events for detecting compressional and shear waves for establishing a first set of data resulting from at least the microseismic events in the formation; and a linear array of distributed fiber optic sensors extending along at least a portion of the wellbore, uphole of the at least one 3-component microseismic sensor, for detecting compressional waves within or adjacent the wellbore for establishing a second set of data for mapping at least noise within the wellbore. The mapping of the second set of data permits extrapolation of noise at the at least one 3-component microseismic sensor, the extrapolated noise being subtracted from the first set of data for producing signals for locating the microseismic event in the formation.

In another broad aspect, a method for microseismic monitoring during a completion operation in a wellbore, comprises deploying at least one 3-component microseismic sensor into the wellbore for detecting compressional and shear waves in a formation adjacent the wellbore and deploying a linear array of distributed fiber optic sensors into the wellbore extending along at least a portion of the wellbore, uphole of the at least one 3-component microseismic sensor, for detecting compressional waves within or adjacent the wellbore. The completion operation is initiated, creating microseismic events in the formation. The microseismic events are sensed in the formation with the at least one 3-component microseismic sensor resulting from at least the microseismic events in the formation for establishing a first set of data. At least noise within the wellbore uphole of the at least one 3-component microseismic sensor is sensed with the linear array of distributed fiber optic sensors for establishing a second set of data. The second set of data is mapped as noise along the wellbore. The noise is extrapolated to the at least one 3-component microseismic sensor, from the noise mapping and the extrapolated noise is subtracted from the first set of data for producing signals representative of the location of the microseismic event in the formation.

The first set of data can be transmitted to surface in real time, such as through electrically-enabled coiled tubing or can be stored in memory in each geophone for later retrieval.

The orientation of the microseismic sensors is established through means for orienting the microseismic sensors when deployed in the wellbore or through sensors which detect the orientation permitting mathematic manipulation of the first set of data for the orientation of the sensors. Each of the microseismic sensors is acoustically coupled to the wellbore.

BRIEF DESCRIPTION OF THE DRAWINGS

FIGS. 3A to 3C are representative illustrations of a microseismic monitoring system, more particularly.

FIGS. 5A-5D are representative illustrations of means used to couple the sensors to the borehole or casing, more particularly

DETAILED DESCRIPTION

In a co-pending application, U.S. 61/639,493, incorporated herein in its entirety, Applicant has disclosed deploying a sensor, such as a geophone or accelerometer, integrated into a bottomhole assembly (BHA) which utilizes electrically and/or electronically-actuated apparatus for performing a completion operation. Thus, the sensor is positioned in the wellbore as close as possible to the event for obtaining data which can be transmitted to surface for monitoring the fracture growth and placement in the formation. Bi-directional communication for actuation of the electronically-actuated tools and receipt of data therefrom is possible using electrically-enabled coiled tubing (CT), such as described in co-pending, US published application US2008/0263848 to Andreychuk.

Figures 1A, 1B:
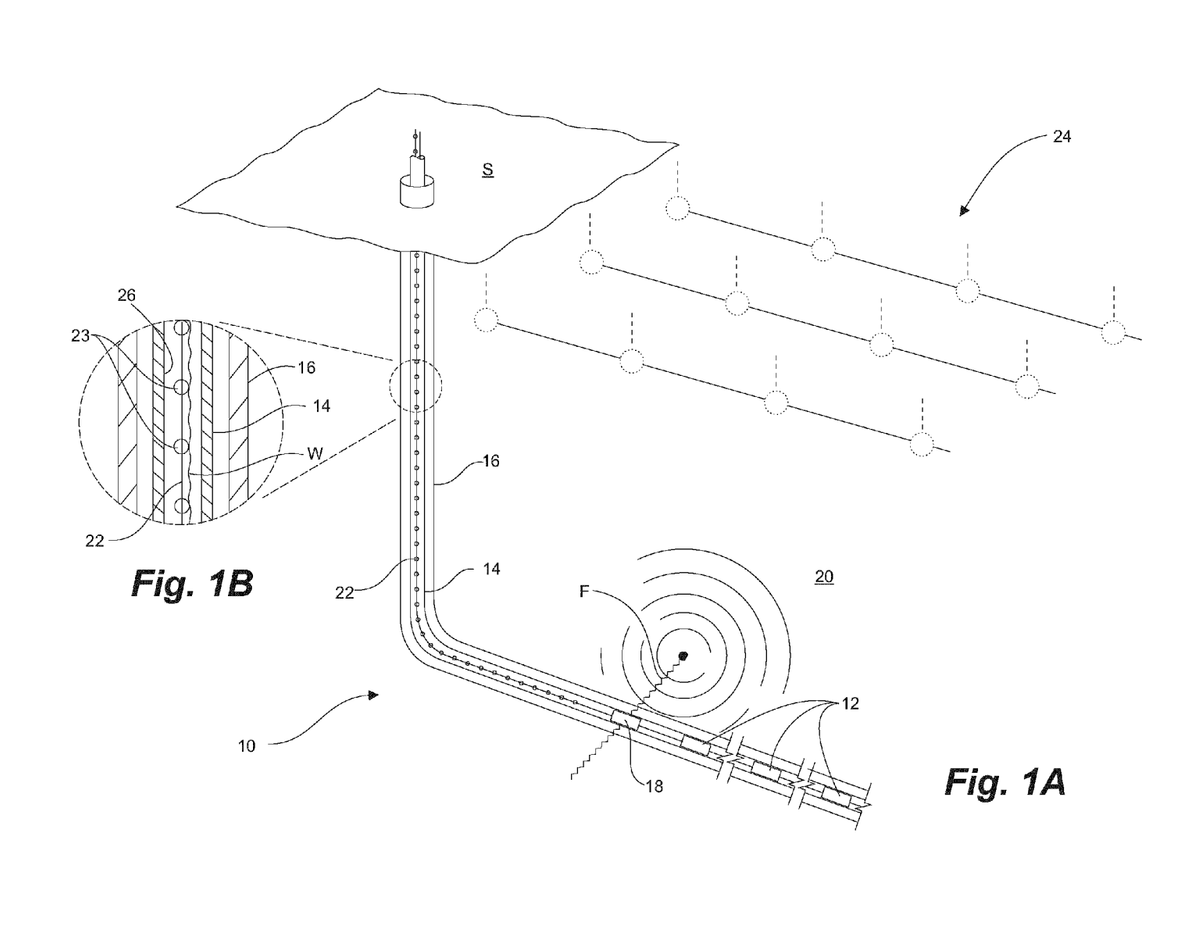
FIG. 1A is a representative illustration of an embodiment incorporating one or more 3-component microseismic sensors in a bottom hole assembly (BHA), deployed in a treatment wellbore using coiled tubing or wireline, and a linear array of fiber optic distributed sensors extending along a length of the coiled tubing or wireline for mapping noise about the wellbore, an optional near surface array being shown in dotted lines.
FIG. 1B is a detailed representative illustration of a sectional view of the treatment wellbore showing coiled tubing having the linear array of fiber optic sensors and an electrical conductor retained therein.
Figures 2A, 2B:
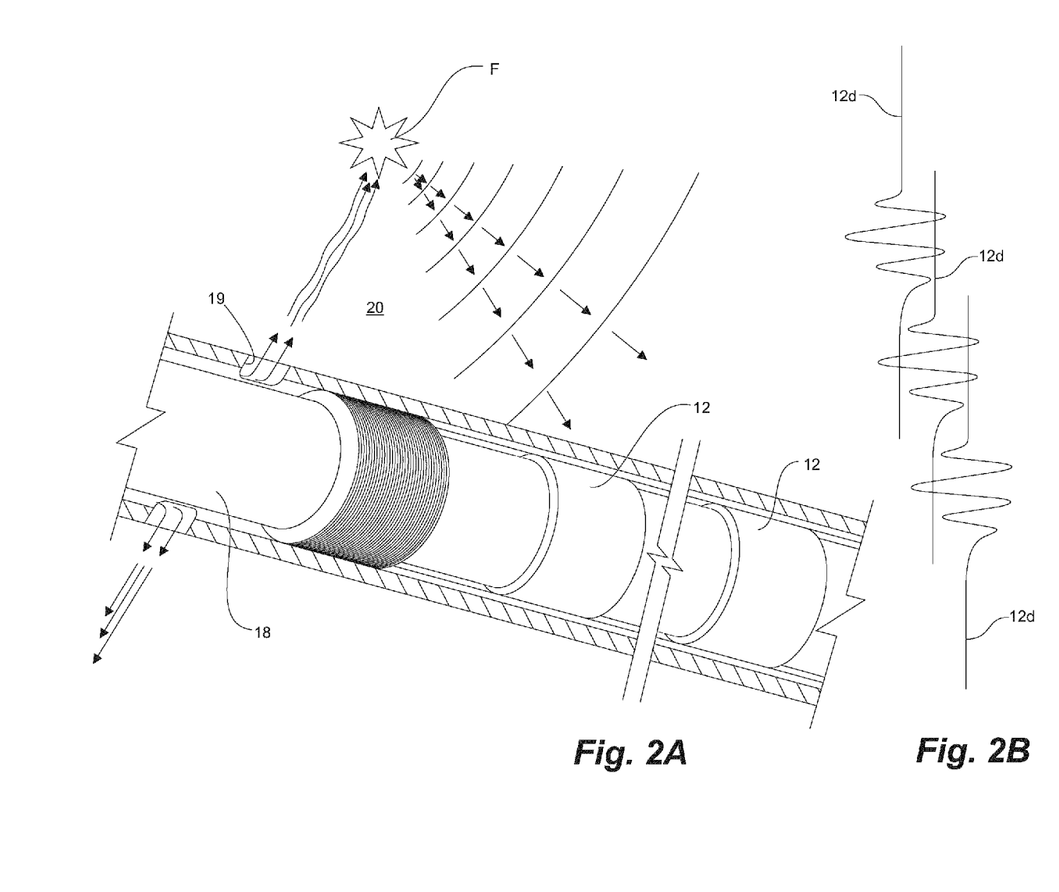
FIGS. 2A and 2B are representative illustrations of a BHA used for fracturing, the BHA having one or more 3-component sensors therein (FIG. 2A) and a representative example of 3-axis data detected therewith (FIG. 2B)

In a microseismic monitoring system 10, shown in FIGS. 1A-3C and more specifically in FIG. 1A, at least one microseismic sensor 12, such as a geophone, accelerometer or the like, is deployed, using coiled tubing (CT) 14 or wireline, into a wellbore 16 to be completed. In embodiments, the at least one microseismic sensor 12 may be integrated into a bottom hole assembly (BHA) 18 used to perform a completion operation. Each microseismic sensor 12, typically a 3-component microseismic sensor, detects compressional waves (p-waves) and shear waves (s-waves) from microseismic events in the wellbore 16 and in the formation 20 outside the wellbore 16. In a first set of data collected by the microseismic sensor 12, one cannot easily separate signals generated from the event of interest from signals derived from noise occurring as a result of apparatus used for pumping the completion, such as for pumping fluid for a fracturing operation, and other inherent noise events.

Figures 3A, 3C:
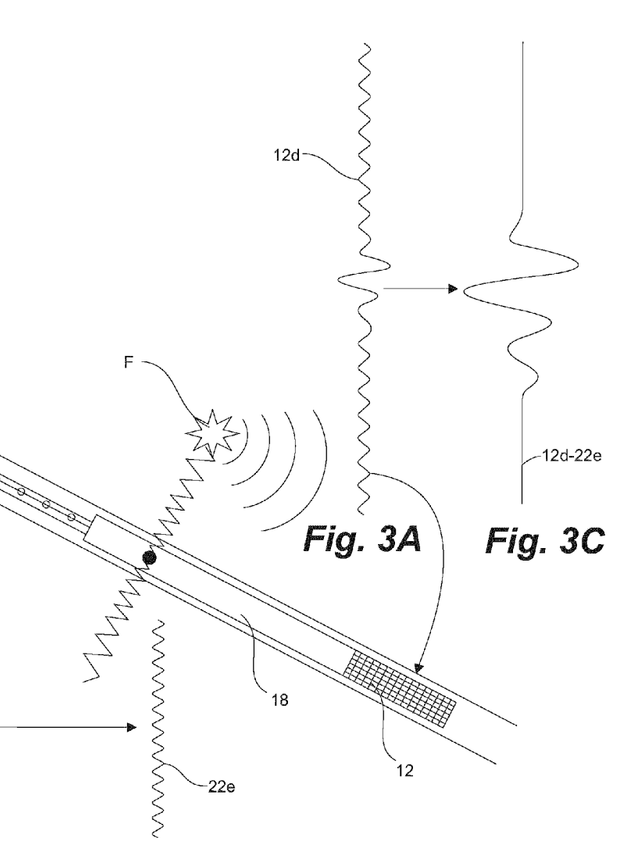
FIG. 3A illustrates a BHA deployed on coiled tubing or wireline according to FIGS. 2A and 2B, with or without a near surface array of sensors.
FIG. 3C illustrates subtracting the estimated noise at the 3-component sensors from the raw data of the 3-component sensors for providing clean signals for locating the microseismic event.
Figure 3B:
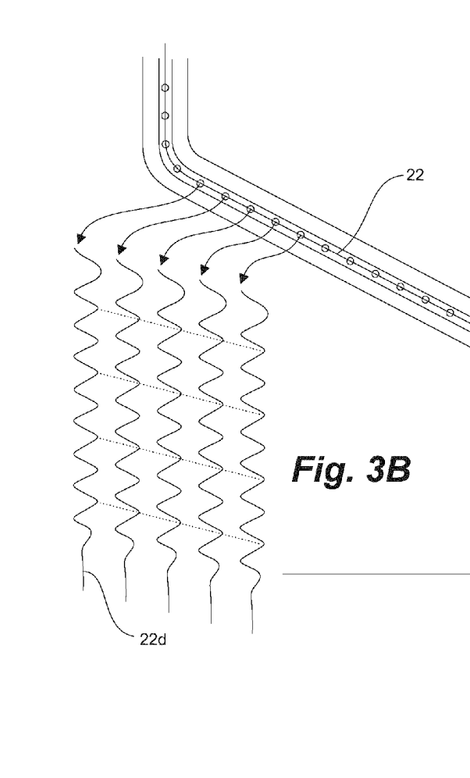
FIG. 3B illustrates data recorded by a plurality of fiber-optic sensors extending along the coiled tubing or wireline for providing spatial sampling of the noise for predicting noise at the 3-component sensors, permitting identification and prediction thereof.

As shown in FIGS. 1A, 1B and 3B, a linear array 22 of fiber optic, distributed sensors 23, such as a plurality of distributed sensors 23 in one or more optical fibers, are also deployed in the wellbore 16 to be completed. The linear array 22 of distributed fiber optic sensors 23 span a length of the wellbore 16 and are capable of detecting p-waves, but do not typically detect s-waves. The linear array 22 of fiber optic sensors 23 is capable of detecting energy originating from within the formation 20 adjacent the wellbore 16. The detected energy however can only be used to estimate a distance away from the linear array 22 at which the energy originated, but not the direction from which the energy originated. Without direction information, the array 22 is not particularly useful in positioning the event in the formation 20. A second set of data collected by the linear array 22 however is utilized for mapping the background noise in the wellbore 16. The noise mapping is useful to "clean up" the first set of data obtained from the one or more microseismic sensor 12.

As taught in SPE 149602, "Distributed Acoustic Sensing a new way of listening to your well/reservoir", by Johanessen et al, March 2012, incorporated herein in its entirety, describes in-well monitoring of fluid flows in a wellbore using distributed acoustic sensors along in-well fiber optics.

Applicant believes that the combination of the ability to obtain the first set of both p-wave data and s-wave data, using the 3-component microseismic sensors 12, such as a 3-component geophone in the BHA 18 deployed adjacent the microseismic event, and the ability to obtain the second set of large numbers of signal data from the plurality of p-wave sensors 23 in the linear array 22. The sensors 23 of the linear array 22 sense largely background noise, permitting one of skill to remove the background noise from the microseismic data to more accurately determine the location of the signals and thus, to locate the microseismic event in the formation 20.

Further, because locating the microseismic event is done using data collected from within the same wellbore 16 as is being completed, Applicant believes that a surface array of seismic sensors is not required. Where there is no surface array, there is no need for the usual vertical velocity profile between wellbore 16 and surface S. Optionally, as shown in FIG. 1A, a surface array 24, as is understood by those of skill in the art, can be used if one wishes to accumulate supplemental data.

Embodiments are described herein in the context of a fracturing operation, however as one of skill in the art will appreciate, embodiments are suitable for use with a wide variety of completion operations or any other operations which create microseismic events in the formation for which monitoring is desirable.

Having reference to FIGS. 2A-3C, in an embodiment of a microseismic monitoring system 10, at least one 3-component microseismic sensor 12 is incorporated into the bottomhole assembly (BHA) 18 which is used for performing a fracturing operation and which is deployed into the wellbore 16 using coiled tubing (CT) 14. Further, at least one linear array 22 of fiber optic, distributed acoustic sensors is operatively connected to an inside wall 26 of the CT 14, as is understood in the art. The linear array 22 extends along at least a portion of the length of the wellbore 16, uphole of the BHA 18.

Figure 6:
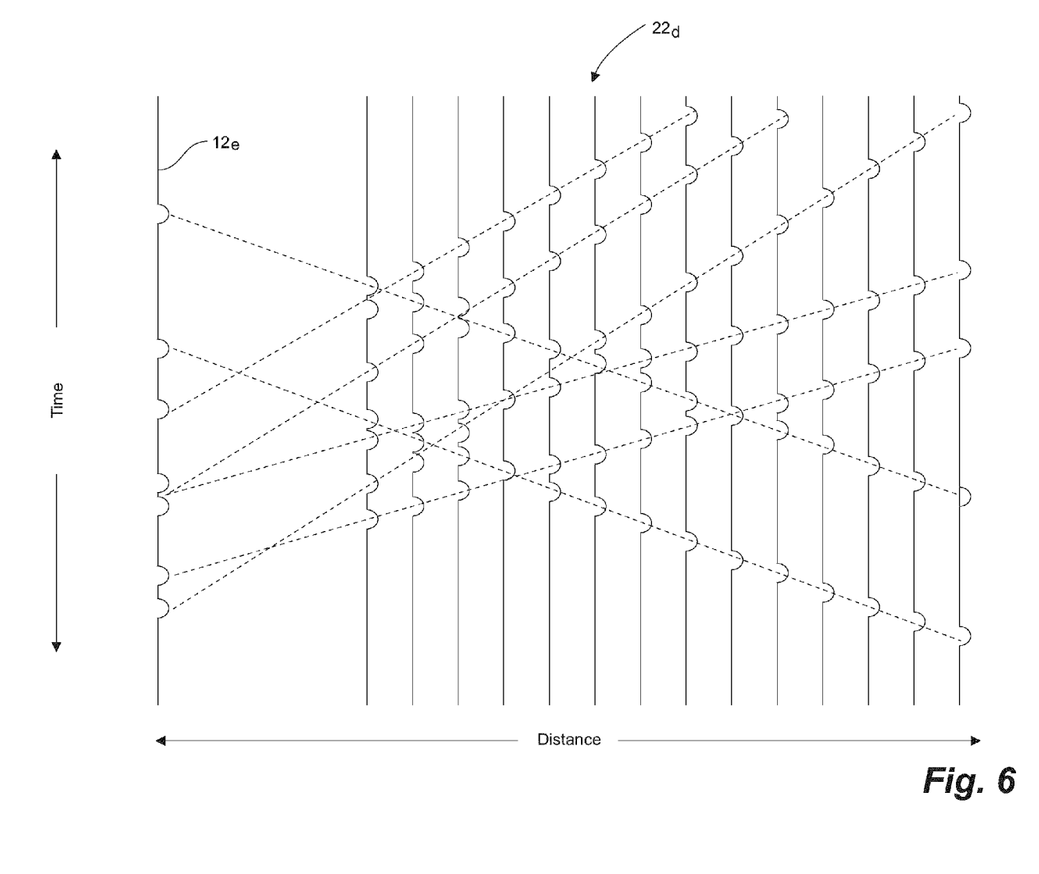
FIG. 6 is a representative illustration of noise date mapped by the fiber optic array and extrapolated to estimate noise at the three or more 3-component sensors for removal from the 3-component sensors data.

Noise, such as caused by pumps used to deliver fracturing fluid, sliding sleeves, fluid movement through the CT 14 and the like, is readily transmitted through the metal CT 14. The linear array 22 of fiber optic sensors, in contact with the CT's inside wall 26, readily detects the transmitted noise. A baseline or ambient state can be monitored prior to initiating the completion operation, such as turning on the pumps and initiating fracture formation, to assist with mapping the noise once the operation is initiated. Furthermore, by actively monitoring the noise within the wellbore 16 during the fracturing operation, estimates of the noise at the location of the 3-component microseismic sensor 12 can be extrapolated from the map of the second set of noise data (FIGS. 3B and 6). The extrapolated noise estimates can then be subtracted from the first set of 3-component sensor data, obtained during the fracturing operation. Subtracting the noise from the first set of 3-component sensor data effectively improves the ability of the 3-component microseismic sensors 12 to detect and locate a microseismic event and a signature thereof (FIG. 3C), resulting from the creation and propagation of the fracture.

As the linear array 22 is sensitive to tensile loading, the optical fibers are embedded in an adhesive or other material which is non-compressible, but which is suitably flexible for CT operations. Thus, any strain changes imparted to the optical fibers are as a result of the microseisms and not to strain imposed by deploying the optical fibers in the CT 14.

Figure 4:
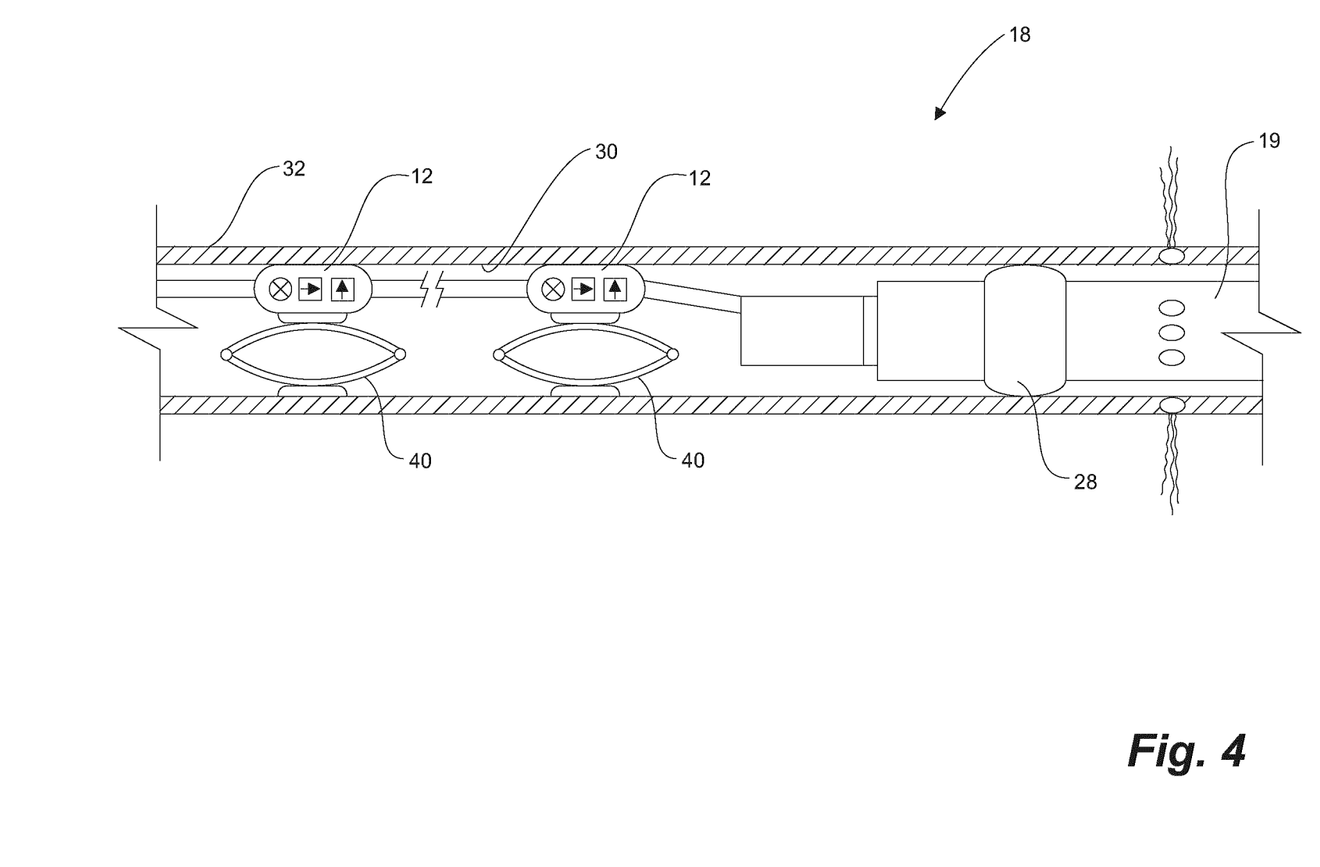
FIG. 4 is a representative illustration of an embodiment incorporating three or more 3-component sensors such as geophones, only two of the three or more sensors being shown.

In an embodiment, as shown in FIGS. 1A and 4, two or more 3-component microseismic sensors 12 incorporated into the BHA 18, three, 3-component microseismic sensors 12 being shown. The three 3-component microseismic sensors 12 are axially spaced from each other along a length of the BHA 18 and are isolated from the flow of fracturing fluid, such as by being positioned downhole from a fracturing fluid delivery sub or fracturing head 19 in the BHA 18. In an embodiment, the three, axially-spaced 3-component microseismic sensors 12 are isolated from the fracturing head 19 by a packer 28. In the case of the CT-deployed BHA 18, the 3-component microseismic sensors 12 are typically configured to be run at the end of the CT 14. Further, the 3-component microseismic sensors 12 are configured so as to be able to acoustically couple with an inside wall 30 of casing 32 or open hole. The sensors 12 are either forced to a particular orientation in the wellbore 16 or have orientation sensors (not shown) which detect orientation of the 3-component microseismic sensors 12 relative to surface S and thus the orientation of fractures located by the system described herein.

The first set of data collected by the 3-component microseismic sensors 12 can be transmitted to surface S in real time, such as through electrically-enabled CT, fiber optics, cabling run to surface through mechanically-actuated tools and the like. As is understood by those of skill in the art, both power and signals can be transmitted using a single wire. In embodiments, a separate wire is incorporated in electrically-enabled CT for connection with the 3-component microseismic sensors 12, being separate from a separate wire incorporated for operating other components of the BHA 18.

Figure 5A:
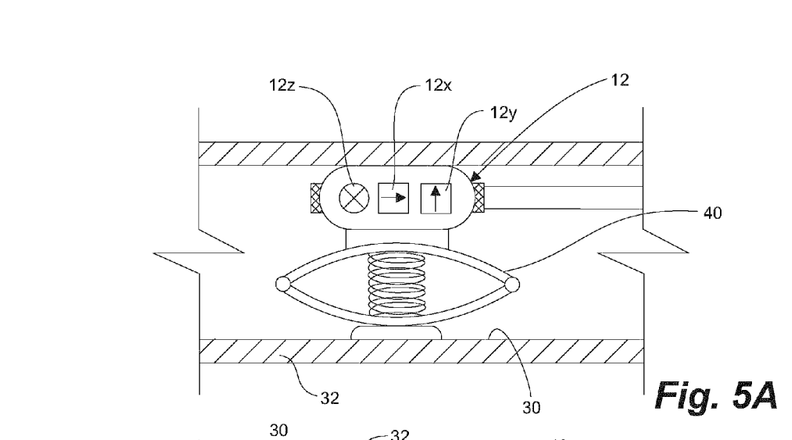
FIGS. 5A and 5B are side and cross-sectional views, respectively, illustrating a spring clamp for coupling the sensor directly to the borehole or casing.
Figure 5B:
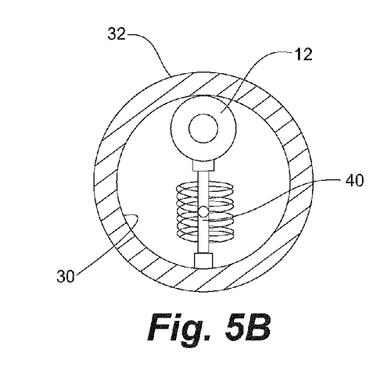
Figure 5C:
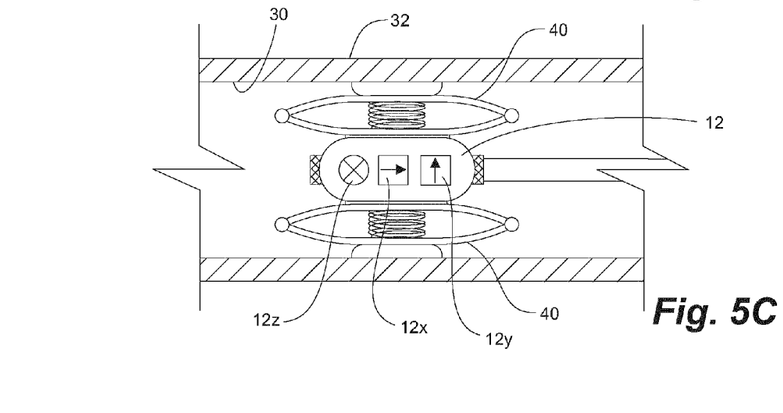
FIGS. 5C and 5D are side and end cross-sectional views respectively illustrating four spring clamps spaced circumferentially about the sensor for centering the sensor in the wellbore, the sensor coupling to the borehole or casing through the clamps.
Figure 5D:
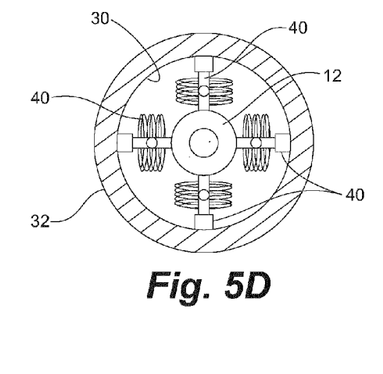

More particularly, as shown in FIG. 5A, each 3-component microseismic sensor 12 comprises three orthogonally oriented geophones $12x, 12y, 12z$. A first benefit is to account for the uncertainty in where the source of incident energy originated. By having three orthogonal geophones $12x, 12y, 12z$, one is able to capture incident energy arriving from any direction. Since any single geophone $12x, 12y$ or $12z$ is only capable of capturing motion in a single direction, at least three geophones $12x, 12y$ and $12z$, oriented orthogonally in each sensor 12, permits capturing motion in any one arbitrary direction.

Secondly, with the ability to detect motion in any direction, one can capture both compressional (p) waves, having particle motion in the direction of propagation, and shear (s) waves, having particle motion perpendicular to the direction of propagation, with equal fidelity.

Thirdly, by measuring the difference in arrival time between the observed compressional and shear wave arrivals for a single event, in combination with an understanding of the local velocity structure, a distance from the 3-component microseismic sensor 12 can be calculated for the origin of that event.

Fourthly, both azimuth and inclination of the waveform impinging on the 3-component microseismic sensor 12 can be determined. By a process referred to as hodogram analysis, which involves cross-plotting of the waveforms recorded on pairs of geophones, the direction of arrival at any 3-component microseismic sensor 12 can be determined, to within 180 degrees. Effectively, the vector defining the direction from which the energy impinged on a single 3-component microseismic sensor 12 would have a sign ambiguity. The direction of arrival could be either (x,y,z) or (−x,−y,−z).

Figure 9:
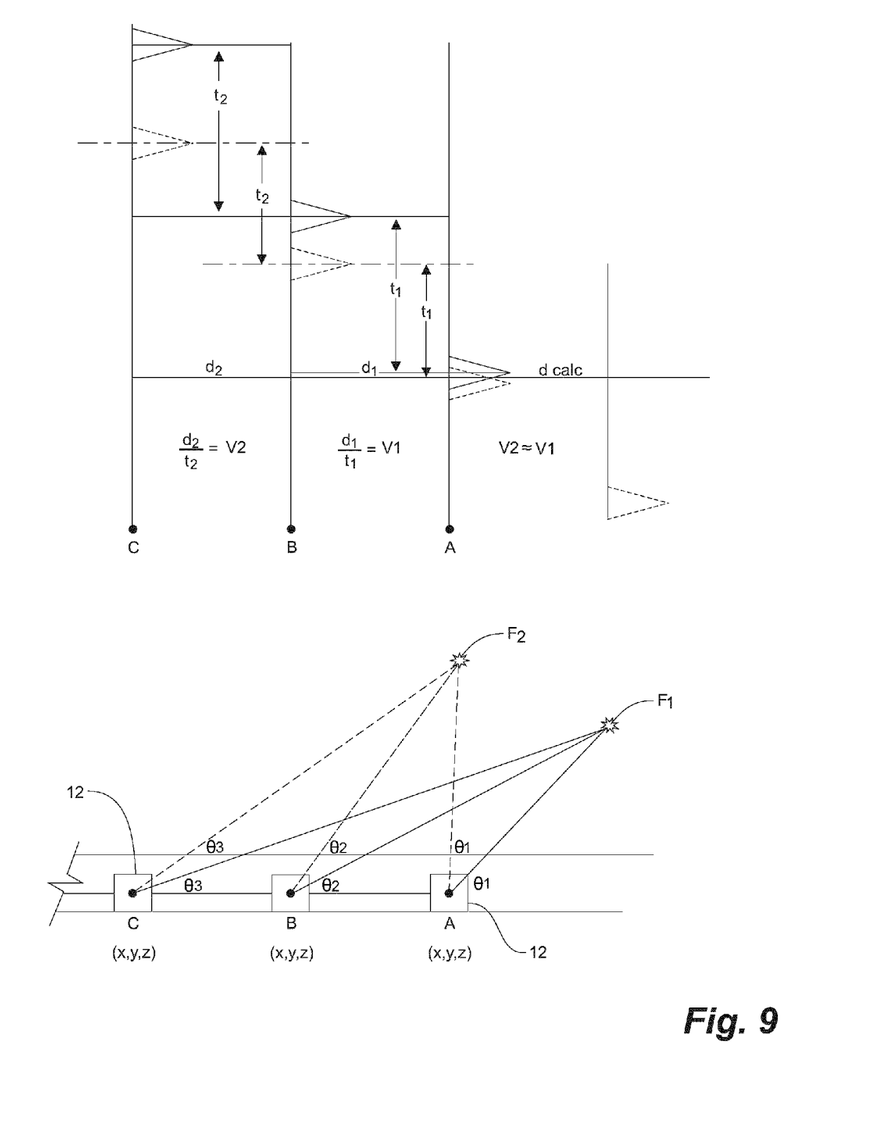
FIG. 9 is a representative illustration of use of clean signals after noise attenuation for locating fractures in the formation.

With reference also to FIG. 9, by adding a second 3-component microseismic sensor 12 at some distance from the first 3-component microseismic sensor 12, directional ambiguity can be substantially eliminated. The second 3-component microseismic sensor 12 permits measurement of a time delay between the observed p or the observed s wave arrivals on each of the first and second 3-component microseismic sensors 12. One can then tell which of the two possible arrival directions is the correct one, as the arrival is delayed at the further sensor 12. The only problem is if the event origin is located on the plane that bisects the first and second 3-component microseismic sensors 12, which, in reality, is most likely due to noise contamination, the region of ambiguity likely being larger than simply the bisecting plane. Adding a third 3-component microseismic sensor 12, spaced some distance from the first and second 3-component microseismic sensors 12, substantially eliminates the final uncertainty.

Monitoring of microseismic events in real time provides the ability to understand where a fracture F is positioned in the formation 20 and the direction and speed the fracture F is growing in all directions (x,y,z) relative to hydraulic fracturing pumping rates, the particular fracturing fluid, and any number of other parameters with respect to the fracturing operation. The ability to rapidly optimize the design and placement of fractures F provides the ability to build databases related thereto which may be of great use to the industry in improving fracture operations. Further, such information permits data, such as where the fluid has gone, to be provided for the public record regarding each stage of the fracturing operation and fracture location and extent.

Particularly advantageous, when monitoring in real time, is the ability to determine whether a fracture F has broken out of a zone, or is imminently in danger of breaking out of the zone so that pumping can be stopped. This is of great interest for many reasons, one of which being where the fracture F is breaking towards a water zone.

Growth of a fracture F, vertically or horizontally at a certain rate, may be related to the pumping rate and concentration of the fracturing fluid. Over time and using the data obtained by embodiments disclosed herein, one could design a fracturing operation to achieve maximum vertical height without breaking out of the zone and maximum, economic horizontal displacement leading to horizontal well spacing optimization and field development optimization.

In the case of openhole wellbores 16, embodiments using microseismic monitoring are less susceptible to noise as there is less transmission of noise in the wellbore 16 without the casing or liner 32.

Optionally, the system 10 can be operated in a memory mode, the data being stored in the 3-component microseismic sensors 12 equipped with memory and a battery, for later retrieval with the BHA 18.

Based upon conventional microseismic monitoring performed remote from the wellbore 16 being completed, one of skill would have thought it desirable to space the 3-component microseismic sensors 12 as far apart as possible in the wellbore 16, such as by about 100 m, to provide optimum time resolution therebetween. Practically speaking however, when deployed with the BHA 18, the spacing between the 3-component microseismic sensors 12 is limited by the size of surface equipment used for injecting the BHA 18 into the wellbore 16. In embodiments, the 3-component microseismic sensors 12 are placed about 1 m apart. In embodiments, the 3-component microseismic sensors 12 are placed at about 5 m to about 10 m apart. However, calculation of velocity becomes less important because the 3-component microseismic sensors 12 are positioned so close to the fracturing events and because there is replication of the arrival times of both the compressional (p) and shear (s) waves at each of the 3-component microseismic sensors 12 permitting accurate calculation of distance without influence by velocity variations. Thus, close spacing is satisfactory. For example, in a conventional arrangement of sensors, a 10% error in velocity becomes significant by the time the signals reach a distant surface S or observation well array. In embodiments disclosed herein however, where the 3-component microseismic sensors 12 are placed so close to the fracturing event, velocity becomes less significant, particularly as there are fewer, or no intervening layers between the event and the 3-component microseismic sensors 12 through which the signals must pass.

Applicant believes that the frequency of noise generated through pumping of the fracture F may be at a higher frequency than that of the microseismic event outside the wellbore 16 (lower frequency). However, even if the frequencies are substantially similar, Applicant believes that the event can be recognized and any effects of the lower frequencies noise can be minimized, according to embodiments disclosed herein.

It is assumed that the acoustic noise, such as that generated from fluid flows or travelling through metal casing 32, tubular and the like, are linear trends and that only one component or geophone of a 3-component microseismic sensor 12 will be affected by the noise. In reality, Applicant believes the other two components will likely also detect at least some of the noise.

As shown in FIGS. 4 and 5A-5D, the 3-component microseismic sensors 12 typically have coupling means 40, such as an outwardly extending arm or clamp, a weighted housing and swivel connection, or the like, to acoustically couple the 3-component microseismic sensor 12 to the inside wall 30 of the casing 32 or open hole. Regardless the orientation, as long as the 3-component microseismic sensor 12 is coupled to the wall 30 and the orientation of the 3-component microseismic sensor 12 is known, such as through a microelectromechanical system (MEMS) sensor, the data can be mathematically adjusted for orientation and thereafter interpreted.

Once the noise is known, using the linear array 22, Applicant believes that a conventional noise reduction means, such as a band-pass or band-reject filter may be sufficient to remove the linear noise, of the second set of data, from the first set of data from each of the 3-component sensors to produce a relatively clean signal which can then be further analysed to determine the location of the microseismic event. Examples of other suitable noise reduction techniques can be found in a variety of prior art references including but not limited to the following:

"Spatial prediction filtering in the t-x and f-x domains" by Scott Hornbostel in Geophysics, Vol. 56, No. 12, (December 1991); pp. 2019-2026;

"Linear and parabolic T -p transforms revisited" by Zhou et al in Geophysics, Vol. 59, No. 7 (July 1994); pp 1133-1149;

"Lateral prediction for noise attenuation by t-x and f-x techniques" by Abma et al in Geophysics, Vol. 60, No. 6 (November-December 1995); pp 1887-1896; and "Random Noise Reduction" by Luis Canales; 54th Ann. Internat. Mtg., Soc. Expl. Geophys., Expanded Abstracts, 525.

Applicant believes however that the addition of the linear array 22 of fiber-optic sensors 23 (FIG. 1A), deployed along the wellbore 16 as described herein, and used in combination with the 3-component microseismic sensors 12 (FIG. 5), provides signals sufficiently clean to permit accurate determination of the position of the microseismic event within the formation 20. The noise mapped from the second set of data from the linear array 22, as shown in FIG. 6, is used to extrapolate noise at the 3-component microseismic sensors 12. The extrapolated noise can then be removed from the first set of data from each of the three 3-component microseismic sensors 12 and the clean signals thereafter used to locate the microseismic event (fracture F), as is understood by those of skill in the art, such as is shown in FIG. 9.

In another embodiment, the BHA 18 comprising the 3-component microseismic sensors 12 is deployed into the wellbore 16 using wireline. In this embodiment, the linear array 22 is integrated into the wireline, as is known in the art.

EXAMPLES

Figure 7:
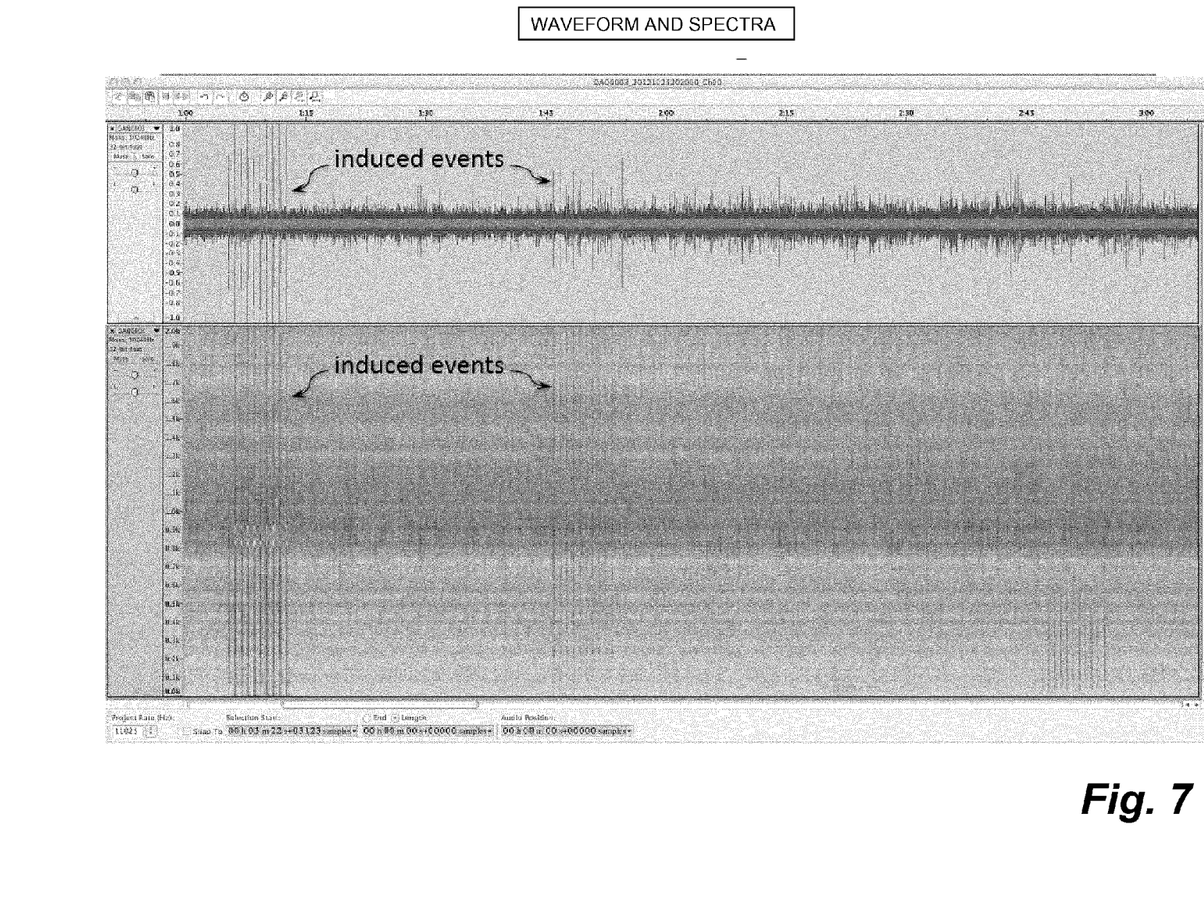
FIG. 7 illustrates waveform and spectral data from one of the one or more sensors, being geophones.
Figure 8:
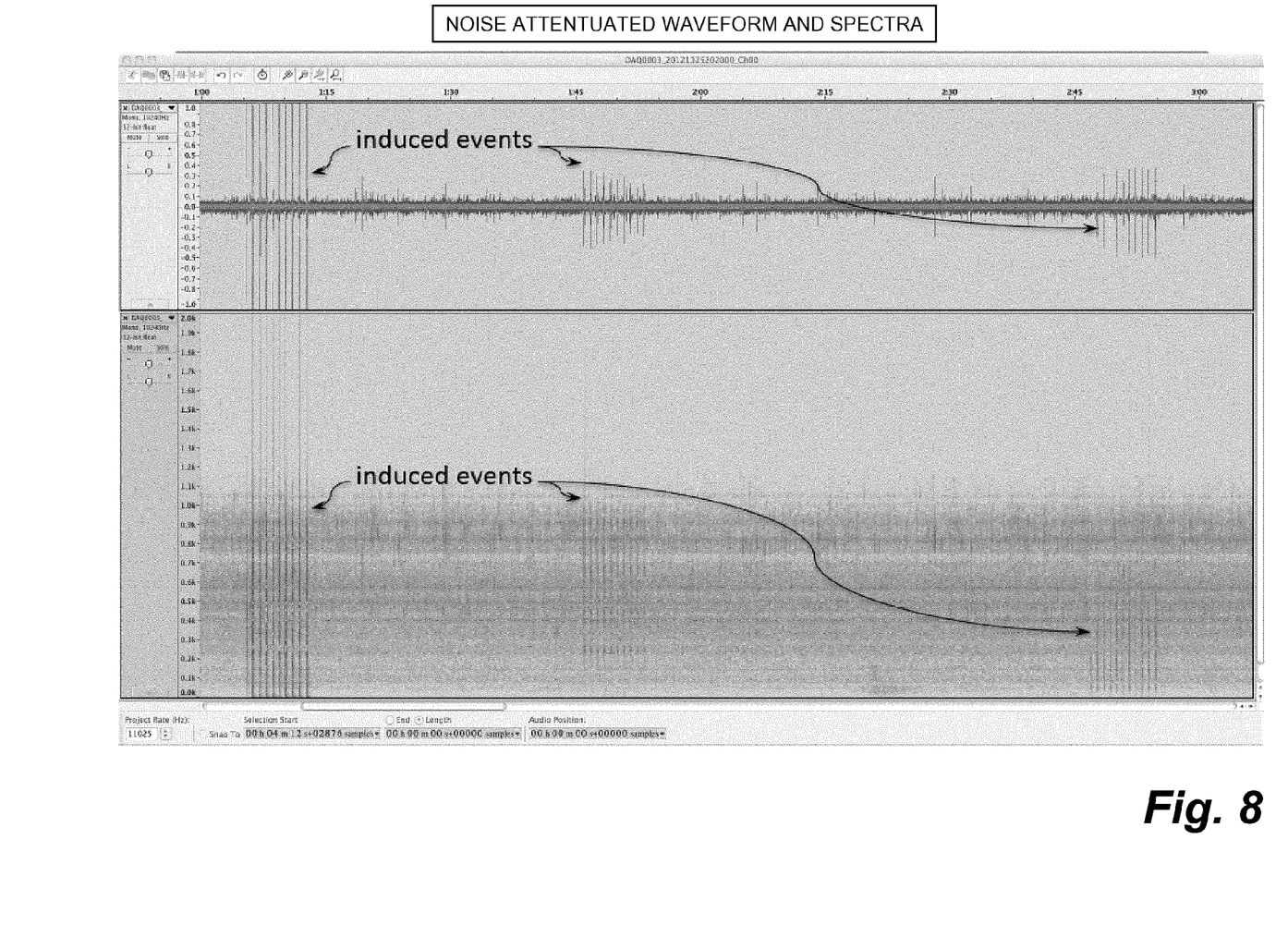
FIG. 8 illustrates data as shown in FIG. 7 following noise attenuation using conventional noise filtering.

Having reference to FIGS. 6-8, in a bench test scenario, Applicant deployed three, spaced apart, 3-component-type geophones, capable of detecting sheer and pressure waves and a fiber-optic cable forming a linear array of sensors capable of detecting compressional noise (p-waves), into 100 m of tubing which was buried in the ground. Water was pumped through the tubing to create ambient acoustic noise. At the same time, a noise event was made outside of the tubing.

The sensor data, detected by both the fiber-optic cable sensor array (FIG. 6) and the three, 3-component geophone array (FIGS. 7 and 8), was collected and analysed.

As shown in FIGS. 3A, 3B and 6, noise 22d at each of the distributed sensors in the fiber optic array 22 was mapped relative to the distance between the sensors and the time detected. From the noise mapping, noise 22e anticipated at the location of each of the geophones 12 was extrapolated. The extrapolated noise 22e can then be subtracted from the first set of data 12d for each of the geophones for producing a clean signal.

Having reference to FIG. 7, a waveform and spectra recorded at one of the geophones is shown. FIG. 8 illustrates the waveform and spectra following noise attenuation which can be performed using conventional methodologies such as filtering or by applying the noise map generated from the fiber optic array as taught herein.

As shown in FIG. 9, the relatively clean signals from each of the 3-geophones (9 sensors in total, being 3-x, 3-y and 3-z) is used to locate the microseismic event in the formation using techniques known in the art. As one of skill in the art will appreciate, the velocity V1, V2 of acoustic events at the locations of each of the geophones A,B,C is anticipated to be substantially the same. Given a known time of receipt of the signals at each of x,y and z for each of the geophones and a known distance between the geophones d1,d2, the velocity V1, V2 can be calculated. Having determined the velocity, distance dcalc to the microseismic event can be calculated and the microseismic event located within the formation.

The embodiments in which an exclusive property or privilege is claimed are defined as follows:

1. A system deployed within a wellbore for detecting microseismic events in a formation adjacent the wellbore, comprising:
    at least one 3-component microseismic sensor deployed in the wellbore adjacent the microseismic events for detecting compressional and shear waves for establishing a first set of data resulting from at least the microseismic events in the formation; and
    a linear array of distributed fiber optic sensors extending along at least a portion of the wellbore, uphole of the at least one 3-component microseismic sensor, for detecting compressional waves within or adjacent the wellbore for establishing a second set of data for mapping at least noise within the wellbore;
    wherein the mapping of the second set of data permits extrapolation of noise at the at least one 3-component microseismic sensor, the extrapolated noise being subtracted from the first set of data for producing signals for locating the microseismic event in the formation.

2. The system of claim 1 wherein the at least one 3-component sensor and the linear array of fiber optic sensors are deployed into the wellbore using coiled tubing, and wherein,
    the linear array of fiber optic sensors is operatively coupled to an inside wall of the coiled tubing for receiving noise transmitted therealong.

3. The system of claim 2 wherein the linear array of fiber optic sensors continuously detect noise transmitted through the coiled tubing, the data being used to extrapolate noise at the at least one 3-component sensor.

4. The system of claim 2 wherein the linear array of fiber optic sensors is embedded in a flexible, non-compressible material so as to ensure strain changes imparted to the fiber optic sensors therein result from the noise transmitted thereto and not from strain imparted by deploying of the coiled tubing.

5. The system of claim 2 wherein the linear array of fiber optic sensors detect noise transmitted through the coiled tubing prior to pumping the completion operation for establishing ambient noise.

6. The system of claim 2 wherein the coiled tubing is electrically-enabled, the first set of data being transmitted to surface in real time.

7. The system of claim 2 wherein the at least one 3-component sensor further comprises memory and a battery, the first set of data being stored in the memory for later retrieval with the 3-component sensor.

8. The system of claim 1 wherein the at least one 3-component microseismic sensor is deployed into the wellbore using wireline, the fiber optic sensors being integrated into the wireline for forming the linear array.

9. The system of claim 1 wherein the at least one 3-component sensor is two or more axially-spaced 3-component sensors.

10. The system of claim 9 wherein the two or more 3-component sensors are 3-component geophones.

11. The system of claim 9 wherein the two or more 3-component sensors are axially spaced from about 5 m to about 10 m apart.

12. The system of claim 9 wherein the two or more 3-component sensors are three, axially-spaced 3-component geophones.

13. The system of claim 1 wherein the at least one 3-component sensor further comprises means for orienting.

14. The system of claim 1 wherein the at least one 3-component sensor further comprises orientation sensors.

15. The system of claim 1 wherein the at least one 3-component sensor further comprises means for acoustically coupling the sensor to the wellbore.

16. A method for microseismic monitoring during a completion operation in a wellbore, the method comprising:
    deploying at least one 3-component microseismic sensor into the wellbore for detecting compressional and shear waves in a formation adjacent the wellbore;
    deploying a linear array of distributed fiber optic sensors into the wellbore extending along at least a portion of the wellbore, uphole of the at least one 3-component microseismic sensor, for detecting compressional waves within or adjacent the wellbore;
    initiating the completion operation, creating microseismic events in the formation;
    sensing microseismic events in the formation with the at least one 3-component microseismic sensor resulting from at least the microseismic events in the formation for establishing a first set of data;
    sensing at least noise within the wellbore uphole of the at least one 3-component microseismic sensor with the linear array of distributed fiber optic sensors for establishing a second set of data;
    mapping the second set of data as noise along the wellbore;
    extrapolating the noise, to the at least one 3-component microseismic sensor, from the noise mapping; and
    subtracting the extrapolated noise from the first set of data for producing signals representative of the location of the microseismic event in the formation.

17. The method of claim 16, prior to initiating the completion operation, further comprising:
    acoustically coupling the at least one 3-component microseismic sensor to the wellbore.

18. The method of claim 16 prior to initiating the completion operation, further comprising:

monitoring the wellbore with the linear array of distributed fiber optic sensors for establishing ambient noise therein for comparison to the second set of data for mapping the noise therein.

\* \* \* \* \*